United States Patent [19]
Wu

[11] Patent Number: 5,334,673
[45] Date of Patent: Aug. 2, 1994

[54] POLYURETHANE GOLF BALL

[75] Inventor: Shenshen Wu, North Dartmouth, Mass.

[73] Assignee: Acushnet Co., Fairhaven, Mass.

[21] Appl. No.: 814,081

[22] Filed: Dec. 24, 1991

Related U.S. Application Data

[63] Continuation of Ser. No. 556,905, Jul. 20, 1990, abandoned.

[51] Int. Cl.$^5$ ............................................. A63B 37/12
[52] U.S. Cl. ........................... 273/235 R; 260/998.14; 524/874; 524/908; 524/875; 525/453
[58] Field of Search ............... 525/453; 524/908, 874; 260/998.41; 273/235 R

[56] References Cited

U.S. PATENT DOCUMENTS

| | | | |
|---|---|---|---|
| 3,130,102 | 4/1961 | Watson et al. | 273/235 |
| 3,989,568 | 11/1976 | Isaac | 528/65 |
| 5,006,297 | 4/1991 | Brown et al. | 264/234 |

*Primary Examiner*—Ralph H. Dean
*Attorney, Agent, or Firm*—Pennie & Edmonds

[57] ABSTRACT

The golf ball is made from a composition of a polyurethane prepolymer and a slow-reacting polyamine curing agent and/or a difunctional glycol. The slow-reacting polyamine curing agents and difunctional glycols are 3,5-dimethylthio-2,4-toluenediamine; 3,5-dimethylthio-2,6-toluenediamine; N,N'-dialkyldiamino diphenyl methane; trimethyleneglycol-di-p-aminobenzoate; polytetramethyleneoxide-di-p-aminobenzoate; 1,4-butanediol; 2,3-butanediol; 2,3-dimethyl-2,3-butanediol; ethylene glycol; and mixtures thereof.

11 Claims, No Drawings

POLYURETHANE GOLF BALL

This is a continuation of application Ser. No. 07/566,905 filed Jul. 20, 1990, now abandoned.

The present invention relates to golf balls and more particularly to polyurethane covered golf balls made from a polyurethane composition of a polyurethane prepolymer cured with a slow-reacting curing agent selected from the group of slow-reacting polyamine curing agents and difunctional glycols. Such a golf ball has improved resiliency and shear resistance over golf balls made from conventional polyurethane formulations.

Conventionally, golf balls are made by molding a cover about a core that is either a solid one-piece core or a wound core made by winding thin elastic thread about a center. The center is either a solid mass or a liquid-filled envelope which has been frozen prior to winding the thread therearound. Golf balls made from a solid core are referred to conventionally as two-piece balls while those with wound cores are referred to as three-piece balls. Attempts have been made to make a one-piece golf ball, i.e. a solid homogeneous golf ball; however, to date no commercially acceptable one-piece golf ball has been made.

Balata had been used as the primary material for covers of golf balls until the 1960's when SURLYN®, an ionomeric resin made by E.I. dupont de Nemours & Co., was introduced to the golf industry. SURLYN® costs less than balata and has a better cut resistance than balata. At the present time, SURLYN® is used as the primary source of cover stock for two-piece golf balls. The problem with SURLYN®-covered golf balls, however, is that they lack the "click" and "feel" which golfers had become accustomed to with balata. "Click" is the sound made when the ball is hit by a golf club while "feel" is the overall sensation imparted to the golfer when the ball is hit.

It has been proposed to employ polyurethane as a cover stock for golf balls because, like SURLYN®, it has a relatively low price compared to balata and provides superior cut resistance over balata. However, unlike SURLYN®-covered golf balls, polyurethane-covered golf balls can be made to have the "click" and "feel" of balata.

Polyurethane is the product of a reaction between a polyurethane prepolymer and a curing agent. The polyurethane prepolymer is a product formed by a reaction between a polyol and a diisocyanate. The curing agent is either a diamine or glycol. A catalyst is often employed to promote the reaction between the curing agent and the polyurethane prepolymer.

Conventionally, there are two categories of polyurethane on the market, thermoset and thermoplastic. Thermoplastic polyurethanes are made from a diisocyanate, such as 4,4'-diphenylmethane diisocyanate (MDI) or 3,3'-dimethyl-4,4'-biphenylene diisocyanate (TODI), and a polyol cured with a diol, such as 1,4-butanediol. Thermoset polyurethanes are made from a diisocyanate, such as 2,4-toluene diisocyanate (TDI) or methylenebis-(4-cyclohexyl isocyanate) (HMDI), and a polyol which is cured with a polyamine, such as methylenedianiline (MDA), or a trifunctional glycol, such as trimethylol propane, or tetrafunctional glycol, such as N,N,N',N'-tetrakis(2-hydroxypropyl)ethylenediamine.

U.S. Pat. No. 4,123,061 issued Oct. 31, 1978 teaches that a golf ball can be made from a polyurethane prepolymer of polyether and a curing agent, such as a trifunctional polyol, a tetrafunctional polyol or a diamine. The specific diamines taught by the '061 patent are 3,3'-dichlorobenzidene; 3,3'-dichloro-4,4'-diaminodiphenyl methane (MOCA); N,N,N',N'-tetrakis(2-hydroxypropyl)ethylenediamine and Curalon L, a trade name for a mixture of aromatic diamines sold by Uniroyal, Inc. These diamines are recognized by those of skill in the art as being fast-reacting diamine curing agents.

U.S. Pat. No. 3,989,568 issued Nov. 2, 1976 teaches a three-component system employing either one or two polyurethane prepolymers and one or two curing agents. Both polyol and diamine curing agents are taught by the '568 patent. The essential feature is that the reactants chosen for the system must have different rates of reactions within two or more competing reactions. The specific diamine curing agents taught are unhindered amines, such as methylenedianiline (MDA), and aromatic hindered amines, such as 5,5'-methylene-bis-(methyl anthranilate). These diamines are recognized by those of skill in the art as being fast-reacting diamine curing agents.

It has now been discovered that a polyurethane prepolymer cured with a slow-reacting curing agent selected from the group of slow-reacting polyamine curing agents or difunctional glycols produces a golf ball cover that has good durability and performance. Golf balls made in accordance with the present invention have been found to have improved shear resistance and cut resistance compared to golf balls having covers made from either balata or SURLYN®.

Broadly, the present invention is a golf ball product made from a polyurethane prepolymer cured with a slow-reacting curing agent selected from the group of slow-reacting polyamine curing agents or difunctional glycols. The term "golf ball product" as used in the specification and claims means a cover, a core, a center or a one-piece golf ball. The cover of a golf ball made in accordance with the present invention has been found to have good shear resistance, cut resistance, durability and resiliency. Preferably, the polyurethane composition of the present invention is used to make the cover of a golf ball.

Suitable polyurethane prepolymers for use in the present invention are made from a polyol, such as polyether, polyester or polylactone, and a diisocyanate. Suitable diisocyanates for use in the present invention include 4,4'-diphenylmethane diisocyanate (MDI) and 3,3'-dimethyl-4,4'-biphenylene diisocyanate (TODI).

Suitable polyether polyols include polytetramethylene ether glycol; poly(oxypropylene) glycol; and polybutadiene glycol. Suitable polyester polyols include polyethylene adipate glycol; polyethylene propylene adipate glycol; and polybutylene adipate glycol. Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable curatives for use in the present invention are selected from the slow-reacting polyamine group consisting of 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate; or a difunctional glycol; and mixtures thereof. 3,5-dimethylthio-2,4-toluenediamine and 3,5-dimethylthio-2,6-toluenediamine are isomers and are sold under the trade name ETHACURE ® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK ® by UOP.

Suitable difunctional glycols are 1,4-butanediol; 1,3-butanediol; 2,3-butanediol; 2,3-dimethyl-2,3-butanediol; dipropylene glycol; and ethylene glycol. Difunctional glycols are inherently slow-reacting.

A slow-reacting curing agent with respect to amines means that the amine groups on the curing agent are sterically and/or electronically hindered because of the presence of electron withdrawing groups or interfering bulky groups situated adjacent to the reaction sites. A long chain flexible spacer of at least four carbons between reaction sites or three carbons with electron withdrawing groups also contributes to the slower reactivity of polyamines.

Slow-reacting polyamine curing agents such as 3,5-dimethylthio-2,4-toluenediamine and 3,5-dimethylthio-2,6-toluenediamine are isomers with two or more of the sites on the benzene ring substituted with groups that sterically hinder the reaction ability of the amine groups. Slow-reacting polyamine curing agents such as trimethylene glycol-di-p-aminobenzoate and polytetramethyleneoxide-di-p-aminobenzoate have the two amine groups situated adjacent to two electron withdrawing carbonyl groups,

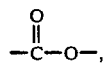

and are separated by flexible spacers, trimethylene,

and polytetramethyleneoxide,

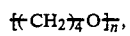

respectively. Still another suitable group of polyamines comprises N,N'-dialkyldiamino diphenyl methane such as 4,4'-dibutyl diamine diphenyl methane wherein the aromatic amine group, —$\phi$—NH$_2$, is substituted by an alkyl group to become an aromatic secondary amine,

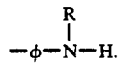

The alkyl groups attached to the amine atoms, the flexible spacers between the amine groups, electron withdrawing groups and bulky groups substituted adjacent to the amine atoms all contribute to attenuate the reactivity of the amine, offering an increase in reaction time.

Preferably, a golf ball is made in accordance with the present invention by molding a cover about a core wherein the cover is formed from a polyurethane composition comprising a polyurethane prepolymer and a slow-reacting polyamine curing agent or a difunctional glycol. Preferably, the cover is molded about the core in accordance with the teaching of U.S. patent application Ser. No. 314,466 filed Feb. 22, 1989. The '466 application is incorporated herein by reference.

It has also been found that in order to alleviate the undesirable yellowish color of the polyurethane cover an effective amount of white pigment and violet agent can be added to the cover composition. Suitable violet agents include PV Fast Violet RL Special and Hostapern Violet RL Extra Strong sold by Hoechst Celanese Corporation; and Violet 23 sold by Sun Chemical Corporation. The amount of violet agent added to the cover composition is preferably about 0.0005% to about 0.002% based on total weight of cover stock. Good results have been obtained with about 0.001% by weight. Preferably, about 3.5% of white pigment by weight of the total cover composition is used in the cover stock of the present invention. Suitable white pigments include titanium dioxide, calcium carbonate, zinc oxide and zinc sulfide.

Additional components which can be added to the cover composition include U.V. stabilizers and other dyes, as well as optical brighteners and fluorescent pigments and dyes in conventional amounts.

There are two basic techniques used to process urethane elastomers, the prepolymer technique and the one-shot technique. The prepolymer technique requires initially the reaction between a base polyol and an excess base diisocyanate to produce a prepolymer with about 7.5% to 14% isocyanate groups (NCO). The prepolymer is further reacted with an appropriate curative to produce the elastomer. The one-shot technique utilizes the diisocyanate, the base polyol and the curative to react all in one step. The prepolymer technique is preferred because it provides better control of chemical reaction and, consequently, results in more uniform properties for the elastomers.

The preferred process for making a molded golf ball cover in accordance with the present invention comprises an initial curing step in an open mold followed by a molding step wherein the core is placed into one of the mold cups. The mold is then closed and the urethane is allowed to cure. The molding step comprises an initial molding step wherein a first mold having smooth-walled fixed-pin mold cups is used followed by a final molding step wherein the smooth-surfaced golf ball product from the initial molding step is subject to a second mold having mold cups with a negative dimple pattern which is used to overmold a dimple pattern onto the smooth-surfaced golf ball product.

The preliminary curing step in the process of the present invention comprises introducing into both halves of an open mold urethane cover stock material and allowing that material to partially cure. The time necessary for the partial curing will vary, depending on the exact composition of the cover stock. The applicant has found that the length of time necessary for the partial curing is about equal to the time needed for the urethane to become sufficiently adhesive between the wall of the mold cup and the core to prevent a core placed in the top mold cup from falling out of the mold cup when the top mold cup is swung over and placed on top of the bottom mold cup. Good results have been obtained at a time of about 0.5 minute. The period for the initial curing is conveniently determined between a mold cup made from stainless steel or brass and a core.

A convenient method for determining the length of time necessary for the initial curing step is to measure the viscosity of the urethane cover stock. Generally, there is about a two-fold increase in the viscosity of the polyurethane. To determine the viscosity, about 2 ml of polyurethane cover stock is placed onto a polished aluminum surface which is at an angle of 300 to the horizontal. Upon initially mixing the cover stock, prepolymer plus curing agent, the cover stock stock will travel 3 inches (7.62 cm) in about 5 seconds. At the time the initial curing step is complete, about 2 ml of the cover stock will travel 3 inches (7.62 cm) on the 30° aluminum surface in about 30 seconds.

In the initial molding step, cover stock flows about the core while pins correctly position the core inside the cover stock and a golf ball product that has substantially the size and shape of a finished golf ball is produced. While the mold can be of the retractable-pin type, it is preferred to use a mold with fixed pins, i.e. pins which are not retractable. This golf ball product of the initial molding operation is subjected to a final molding step in which heat and pressure are used to impart a dimple pattern onto the smooth-surfaced golf ball product and to close any pinholes which may exist.

Preferably, in the initial molding step a core, either wound or solid, is placed into the top half of a pin mold and the mold is closed and subjected to low pressure to maintain a seal between mold plates. The smooth-surfaced golf ball product of the initial molding step may be removed from the mold when the ball so produced is capable of being handled without readily becoming marred or deformed. The pins of the initial smooth-walled mold ensure proper positioning of the core during this initial molding step.

In the final molding step, a compression mold is used to impart a dimple pattern upon the cover of the smooth-surfaced golf ball product. In this final molding step, the smooth-surfaced golf ball product is subjected to heat and pressure such that any pinholes which are in the ball's cover are closed and such that the cover conforms to the dimple pattern of the mold halves.

It is essential that the smooth-surfaced golf ball product of the initial molding step be subjected to the final molding step at a time when the cover stock is able to conform to the dimple pattern of the mold cups in the second mold. The mold used for the initial molding step may be either a fixed-pin or a retractable-pin mold. Use of a fixed-pin mold is preferable because of the lower initial cost, lower operating and maintenance costs and ease of use. In either case, the size of the mold cups is about that of a conventional golf ball mold, i.e. nominally 1.68 inches (4.25 cm) for American sized balls and nominally 1.62 inches (4.10 cm) for British sized balls. Both the fixed-pin and retractable-pin molds are conventional.

The mold used in the final molding step is preferably a conventional compression mold in which each of the mold cups has a desired negative dimple pattern.

An intermediate curing step is preferably employed after the initial molding step but before the final molding step. The intermediate curing step allows the cover stock to cure to a point such that the cover stock is able to hold the dimple pattern of the mold halves of the compression mold after applying the heat and pressure of the final molding step. If the intermediate curing step is too short, the cover stock is unable to retain the dimple pattern from the final molding step and a poor quality golf ball is produced. If the intermediate curing step is too long, the cover stock is unable to conform to the dimple pattern of the mold halves from the compression mold. The time period for the intermediate step will vary depending upon the chemical composition of the cover stock and upon the ratio of curing agent and prepolymer used in formulating the cover stock.

The length of time, temperature and pressure will vary empirically with each composition of cover stock. It has been found that the initial molding step is suitably about 5 to about 30 minutes, depending upon the mold temperature and the chemical composition of the cover stock, with enough pressure to keep the mold sealed during the initial molding step.

The intermediate curing step may also be determined empirically. It is typically up to about 1 hour at ambient temperature and pressure.

The initial molding time and the intermediate curing time can be kept to a minimum provided that a sufficient amount of the catalyst is added to the cover stock, the mold temperature is kept high, or the nature of the chemical reaction is fast.

While the length of time, temperature and pressure for the intermediate curing step may be determined empirically, it has been found that this can be calculated by using a rheometer to measure the shear resistance of the cover stock composition. The degree of cure can also be measured by a Vibrating Needle Curemeter sold by Rapra Technology Ltd.

With polyurethanes made in accordance with the present invention, the degree of cure which has taken place is dependent upon, inter alia, the time, temperature, type of curative, and amount of catalyst used. It has been found that the degree of cure of the cover composition is directly proportional to the hardness of the composition. A hardness of about 10D to 30D, Shore D hardness for the cover stock at the end of the intermediate curing step (i.e. just prior to the final molding step) has been found to be suitable for the present invention. More preferred is a hardness of about 12D to 20D.

This hardness is suitably measured with a Shore D Durometer made by Shore Instrument and Mfg. Co., Inc. The measurement is made in accordance with ASTM D 2240, "Indentation Hardness of Rubber and Plastic by Means of a Durometer." This test is performed on a 0.25-inch (6 mm) thick test plaque which has been molded for 5.5 minutes at 140° F. (60° C.) in a test slab mold. The hardness of the plaque is measured after 5.5 minutes and at one-minute intervals thereafter up to a total of 30 minutes. The length of time for the intermediate curing step can be determined when the cover stock reaches a hardness between 10D to 30D as measured by the durometer hardness measurement technique. This length of time is suitably found to be 5 to 30 minutes.

After the intermediate curing, the golf ball product is transferred to a compression mold where the final curing takes place. In this step, the golf ball product is subjected to heat and pressure to form dimples in its surface. If a fixed-pin mold was used in the initial molding step, then the final molding step closes the holes in the cover by subjecting the ball to enough heat and pressure to close the pinholes. This final curing time suitably takes about 1 to 4 minutes, with good results being obtained at about 2 minutes. The temperature is suitably about 150° F. (65.5° C.) to about 275° F. (135° C.), with good results being obtained at about 195° F. (90.5° C.) at about 1800 psi. The total final molding step, including preheating and cooling of the mold, takes approximately 8 minutes.

The dimpled golf ball product from the final molding step can be subjected to standard golf ball finishing operations such as buffing, painting, nameplating and packaging.

These and other aspects of the present invention may be further understood with reference to the following examples.

EXAMPLE 1

This example illustrates making a polyurethane covered two-piece golf ball in accordance with the present invention. Table I below illustrates the components used to make the golf ball cover composition:

TABLE I

|  | Grams |
| --- | --- |
| MDI prepolymer* | 100.00 |
| Polamine 250** | 48.87 |
| White Dispersion | 5.21 |

*MDI prepolymer is 4,4'-diphenylmethanediisocyanate with a polyol of polytetramethylene ether glycol.
**Polamine 250 is polytetramethyleneoxide-di-p-aminobenzoate having a molecular weight of about 476 g/m.

A golf ball was made having a cover formulated from the composition above following the teachings of U.S. patent application Ser. No. 314,466 filed Feb. 22, 1989. This ball was tested against a conventional three-piece ball with a cover made from balata.

The golf ball of the present invention was found to be comparable as illustrated in Table II below:

TABLE II

|  | Present Invention | 384 Tour |
| --- | --- | --- |
| PGA Compression | 104 | 84 |
| Initial Velocity (feet/second) | 252.08 | 252.03 |
| Spin Rate (rpm) |  |  |
| 13° (simulated driver) | 2392 | 2600 |
| 26° (simulated 5-iron) | 4572 | 4721 |
| Distance (meters) (carry only) | 222.10 | 220.91 |

PGA compression was measured with a PGA compression testing machine in a conventional manner. Initial velocity, spin rate and distance were measured in conventional manner. The 384 Tour is a commercial ball sold by Acushnet Company of New Bedford, Mass.

EXAMPLE 2

This example illustrates making a polyurethane covered wound golf ball in accordance with the present invention. Table III below illustrates the components used to make the golf ball cover composition:

TABLE III

|  | Grams |
| --- | --- |
| MDI Prepolymer* | 100.00 |
| 1,4-butanediol | 11.04 |
| White Dispersion | 3.89 |
| DABCO-33LV Catalyst | 0.04 |

*MDI Prepolymer is 4,4'-diphenylmethanediisocyanate with a polyol of polytetramethylene ether glycol.

The golf ball was made having a cover formulated from the composition above following the teachings of U.S. patent application Ser. No. 314,466 filed Feb. 22, 1989. This ball was tested against a conventional three-piece ball with a cover made from balata.

The golf ball of the present invention was found to be comparable as illustrated in Table IV below:

TABLE IV

|  | Present Invention | 384 Tour |
| --- | --- | --- |
| PGA Compression | 85 | 85 |
| Initial Velocity (feet/second) | 252.88 | 251.56 |
| Spin Rate (rpm) |  |  |
| 13° (simulated driver) | 2753 | 2847 |
| 26° (simulated 5-iron) | 4750 | 4672 |
| Distance (meters) (carry only) | 219.18 | 218.45 |

It has also been found that the difunctional glycol curing agent can be used with the slow-reacting polyamine curing agent of the present invention. However, it has been found that if the slow-reacting polyamine curing agent is diluted with a difunctional glycol curing agent, the cover cuts or shears more easily than a cover made with 100% slow-reacting polyamine curing agent.

A golf ball product made in accordance with the present invention can comprise a polyurethane prepolymer cured with a curing agent system comprising 95% to 5% of a slow-reacting diamine curing agent and 5% to 95% of a difunctional glycol curing agent. More preferably, when both curing agents are used together, about 25% to about 75% of the polyamine is used and about 75% to about 25% of the difunctional glycol is used.

It will be understood that the claims are intended to cover all changes and modifications of the preferred embodiments of the invention herein chosen for the purpose of illustration which do not constitute a departure from the spirit and scope of the invention.

What is claimed is:

1. A golf ball comprising a core and a cover wherein said cover is made from a thermosetting polyurethane composition comprising a single polyurethane prepolymer made from any of 4,4'-diphenyl methane diisocyanate or 3,3'-dimethyl-4,4'-biphenyl diisocyanate and a polyol cured with a slow-reacting polyamine selected from the group consisting of 3,5-dimethylthio-2,4-toluenediamine; 3,5-dimethylthio-2,6-toluenediamine; N,N'-dialkyl diamino diphenyl methane; trimethylene glycol-di-p-aminobenzoate; polytetramethyleneoxide-di-p-aminobenzoate and mixtures thereof.

2. The golf ball of claim 1 wherein the polyol is selected from the group consisting of: polytetramethylene ether glycol; poly(oxypropylene) glycol; polybutadiene glycol; 1,4-butanediol initiated caprolactone diethylene glycol initiated caprolactone; trimethylol propane initiated caprolactone; neopentyl glycol initiated caprolactone; polyethylene adipate glycol; polyethylene propylene adipate glycol; and polybutylene adipate glycol.

3. The golf ball of claim 1 wherein said polyurethane composition further comprises an effective amount of white pigment and violet agent to alleviate a yellow color.

4. The golf ball of claim 3 wherein the amount of white pigment is about 3.5% by weight of the total polyurethane cover composition and the amount of the violet agent is about 0.0005% to about 0.002% by weight of the total polyurethane cover composition.

5. A golf ball comprising a core and a cover wherein said cover is made from a single polyurethane prepolymer of a polyol, 4,4'-diphenyl methane diisocyanate and a slow-reacting curing agent, said curing agent consisting essentially of about 5% to 95% by weight of slow-reacting polyamine, selected from the group consisting of 3,5-dimethylthio-2,4-toluenediamine; 3,5-dimethylthio-2,6-toluenediamine; N,N'-dialkyl diamine diphenyl methane; trimethylene glycol-di-p-aminobenzoate; polytetramethyleneoxide-di-p-aminobenzoate and mixtures thereof and about 95% to 5% by weight of difunctional glycol.

6. The golf ball of claim 5 wherein the polyol is selected from the group consisting of: polytetramethylene ether glycol; poly(oxypropylene) glycol; polybutadiene glycol; 1,4-butanediol initiated caprolactone; diethylene glycol initiated caprolactone; trimethylol propane initiated caprolactone; neopentyl glycol initiated caprolactone; polyethylene adipate glycol; polyethylene propylene adipate glycol; and polybutylene adipate glycol.

7. The golf ball of claim 5 wherein the difunctional glycol curing agent is selected from the group consisting of 1,4-butanediol; 1,3-butanediol; 2,3-butanediol; 2,3-dimethyl-2,3-butanediol; dipropylene glycol; ethylene glycol; and mixtures thereof.

8. The golf ball of claim 5 wherein said cover further comprises an effective amount of white pigment and violet agent to alleviate a yellow color.

9. The golf ball of claim 8 wherein the amount of white pigment is about 3.5% by weight of the total polyurethane cover composition and the amount of the violet agent is about 0.0005% to about 0.002% by weight of the total polyurethane cover composition.

10. A golf ball comprising a core and a cover wherein said cover is made from a polyurethane composition consisting essentially of a single polyurethane prepolymer made from any of 4,4'-diphenyl methane diisocyanate or 3,3'-dimethyl-4,4'-biphenyl diisocyanate and a polyol cured with a slow-reacting polyamine curing agent, selected from the group consisting of 3,5-dimethylthio-2,4-toluenediamine; 3,5-dimethylthio-2,6-toluenediamine; N,N'-dialkyl diamino diphenyl methane; trimethylene glycol-di-p-aminobenzoate; polytetramethyleneoxide-di-p-aminobenzoate and mixtures thereof.

11. The golf ball of claim 10 wherein the polyol is selected from the group consisting of: polytetramethylene ether glycol; poly(oxypropylene) glycol; polybutadiene glycol; 1,4-butanediol initiated caprolactone; diethylene glycol initiated caprolactone; trimethylol propane initiated caprolactone; neopentyl glycol initiated caprolactone; polyethylene adipate glycol; polyethylene propylene adipate glycol; and polybutylene adipate glycol.

* * * * *